(12) United States Patent
Bachtrop et al.

(10) Patent No.: US 10,124,717 B2
(45) Date of Patent: Nov. 13, 2018

(54) CUSTOMIZABLE MODULAR LAMP

(71) Applicant: HELLA ROMANIA S.R.L., Ghiroda, TM (RO)

(72) Inventors: Michael Bachtrop, Anröchte (DE); Oliver Budde, Erwitte (DE); Karsten Dieckmann, Geseke (DE); Alexandru-Florin Dragan, Timisoara (RO); Marian Draghici, Timisoara (RO); Adrian Ciprian Firu, Timisoara (RO); Jörg Fischer, Brilon (DE); Stefan Gröne, Brakel (DE); Christian Haase, Erwitte (DE); Anton Haun, Erwitte (DE); Laurentiu Margineanu, Gorj (RO); George Cristian Oproiu, Craiova (RO); Marius Nicolae Dragomir, Timisoara (RO)

(73) Assignee: Hella GmbH & Co. KGaA, Lippstadt (DE)

( * ) Notice: Subject to any disclaimer, the term of this patent is extended or adjusted under 35 U.S.C. 154(b) by 18 days.

(21) Appl. No.: 15/313,664

(22) PCT Filed: Jun. 5, 2015

(86) PCT No.: PCT/RO2015/000014
§ 371 (c)(1),
(2) Date: Nov. 23, 2016

(87) PCT Pub. No.: WO2015/187047
PCT Pub. Date: Dec. 10, 2015

(65) Prior Publication Data
US 2017/0190279 A1    Jul. 6, 2017

(30) Foreign Application Priority Data

Jun. 4, 2014   (RO) .............................. A 2014-00417

(51) Int. Cl.
*B60Q 1/26*    (2006.01)
*B60Q 1/30*    (2006.01)
(Continued)

(52) U.S. Cl.
CPC ................. *B60Q 1/26* (2013.01); *B60Q 1/30* (2013.01); *B60Q 1/34* (2013.01); *B60Q 1/44* (2013.01); *B60Q 2900/00* (2013.01)

(58) Field of Classification Search
CPC ... B60Q 1/26; B60Q 1/30; B60Q 1/34; B60Q 1/44; B60Q 2900/00
(Continued)

(56) References Cited

U.S. PATENT DOCUMENTS

| 1,415,538 | A | * | 5/1922 | Fehring | ............... | B60Q 1/34 116/45 |
| 1,896,495 | A | * | 2/1933 | O'Donnell | ............... | B60Q 1/34 116/42 |

(Continued)

FOREIGN PATENT DOCUMENTS

| EP | 1000296 B1 | 4/2002 |
| EP | 1621402    | 1/2006 |

(Continued)

*Primary Examiner* — R. A. Smith
*Assistant Examiner* — Tania Courson
(74) *Attorney, Agent, or Firm* — Husch Blackwell LLP

(57) ABSTRACT

A customizable modular lamp is made up of an outer lens customized by known per se techniques, which covers a housing provided with at least one recess in which is mounted a customizable module consisting of a retro-reflective lens under which there is an inner customized lens personalized by known per se techniques, under which there is a printed circuit board with LEDs that is held in a holder fastened to a cover provided with at least one element for ventilation. During the daylight, personalization is visible on the outer customized lens. In the darkness and—depending on the recipient's request—when activating the lights for (Continued)

changing direction, position or braking, customization becomes evident by lighting inside the lamp, on the surface of the inner customized lens.

5 Claims, 4 Drawing Sheets

(51) Int. Cl.
  *B60Q 1/34* (2006.01)
  *B60Q 1/44* (2006.01)

(58) Field of Classification Search
  USPC .............. 116/36, 42, 63 R, 63 P, 63 T, 28 R
  See application file for complete search history.

(56) References Cited

U.S. PATENT DOCUMENTS

| | | | | |
|---|---|---|---|---|
| 4,574,269 A | * | 3/1986 | Miller | B60Q 1/503 340/468 |
| 4,631,516 A | * | 12/1986 | Clinker | B60Q 1/503 340/464 |
| 4,682,146 A | * | 7/1987 | Friedman, III | B60Q 1/302 116/42 |
| 4,728,936 A | * | 3/1988 | Guscott | G08B 25/14 340/525 |
| 4,868,542 A | * | 9/1989 | Thompson | B60Q 1/444 340/468 |
| 5,097,612 A | * | 3/1992 | Williams | E01F 9/662 116/28 R |
| 5,249,381 A | * | 10/1993 | Panossian | G09F 21/04 116/28 R |
| 5,905,434 A | * | 5/1999 | Steffan | B60Q 1/50 116/28 R |
| 6,124,783 A | * | 9/2000 | Alexander | B60R 25/104 340/425.5 |
| 6,195,000 B1 | * | 2/2001 | Smith | B60Q 1/503 340/425.5 |
| 6,300,870 B1 | * | 10/2001 | Nelson | B60Q 1/503 340/463 |
| 6,553,285 B1 | * | 4/2003 | Bahmad | B60Q 1/503 116/42 |
| 7,095,318 B1 | * | 8/2006 | Bekhor | B60Q 1/26 340/464 |
| 7,142,104 B1 | * | 11/2006 | Blueford | B60Q 1/503 340/472 |
| 2004/0160782 A1 | | 8/2004 | Zimmermann | |
| 2005/0225994 A1 | * | 10/2005 | Rodriguez Barros | B60Q 1/2665 362/494 |
| 2009/0257241 A1 | | 10/2009 | Meinke | |
| 2016/0169470 A1 | * | 6/2016 | Biernatowski | B60Q 1/30 362/509 |

FOREIGN PATENT DOCUMENTS

GB 2220257 A 1/1990
WO 2011121012 10/2011

* cited by examiner

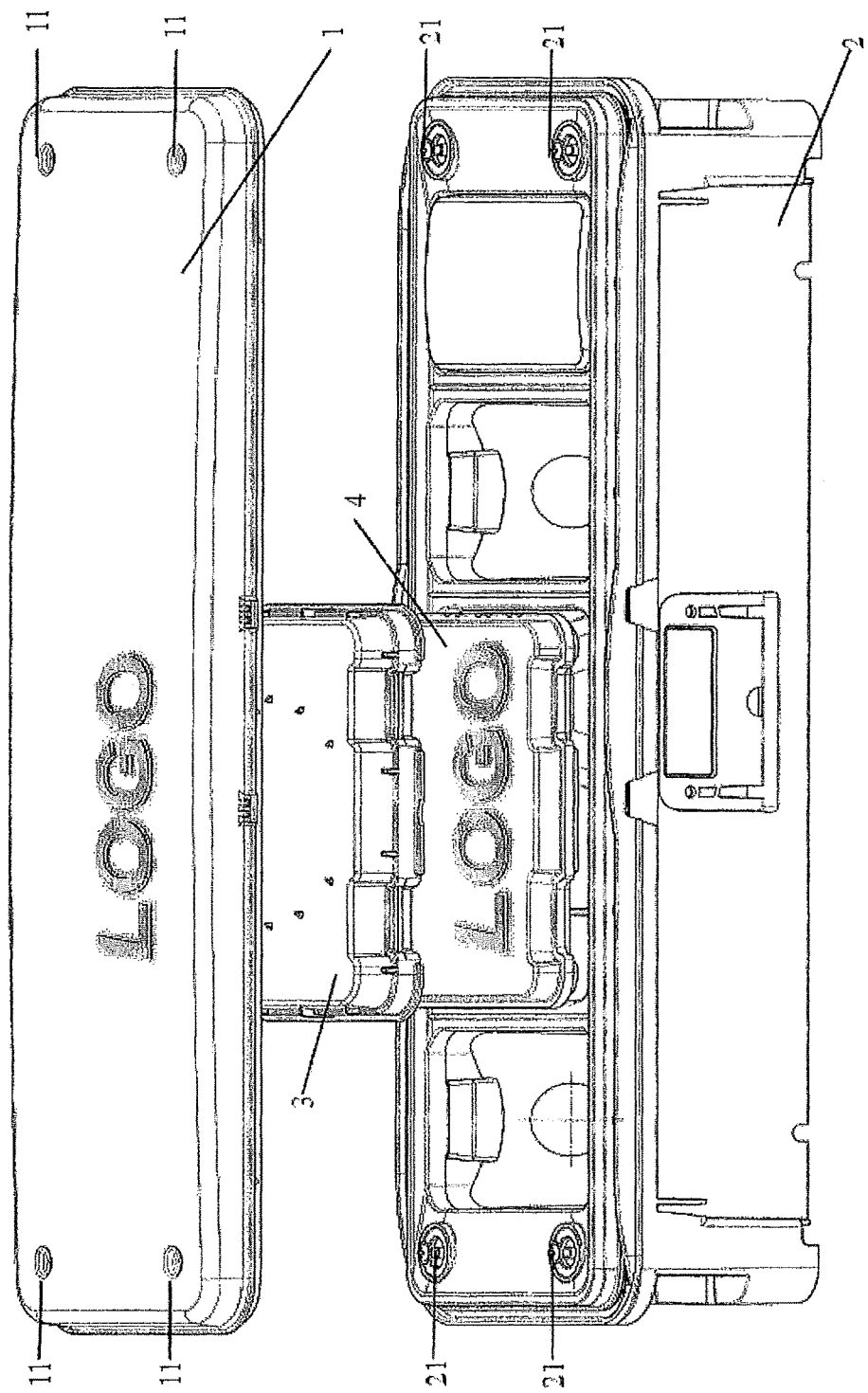

US 10,124,717 B2

CUSTOMIZABLE MODULAR LAMP

CROSS REFERENCE

This application claims priority to PCT Patent Application No. PCT/RO2015/000014, filed 5 Jun. 2015, which itself claims priority to Romanian Application No. a-2014-00417, filed 4 Jun. 2014, the entirety of both of which are hereby incorporated by reference.

FIELD OF THE INVENTION

The invention relates to a modular lamp customizable with graphics or text, depending on the client's request, especially for use in the automotive industry, by manufacturers of trailers for road vehicles.

BACKGROUND OF THE INVENTION

Lamps for vehicles are known, designed so that the light emitted or reflected by them to make it possible to recognize a symbol or text.

Patent DE 202005003397 describes a rear lamp for motor vehicles or bicycles provided with a customized reflector designed to highlight its reflections as an illuminated symbol, and in the absence of a light source, the symbol remains visible as a dark shape.

Patent DE 202006008944 relates to a motor vehicle lamp which includes a logo or symbol, evidenced by the intense illumination when the driver of the vehicle brakes or signals change of direction, an effect obtained by using extra-bright LED inside the lamp.

The disadvantages of known solutions is that they require the manufacturing of the complete lamp assembly according to customization requested by the beneficiary, requiring significant resources to prepare the launch of the production; another disadvantage is that personalization is highlighted only at night, in the presence of incident light sources or certain conditions: braking, signaling change direction and so on, without personalizing be easily observed at all times.

SUMMARY OF THE INVENTION

This invention is about conceiving a modular lamp, being customizable according to customer request, allowing permanent identification of the customization both by day and by night, maintaining compliance with industry-specific technical standards required for type approval.

The technical problem solved by the invention is the construction of a lamp that does not require complete redesign to be customized according to the request of a beneficiary; another technical problem solved by the invention is that personalization of the lamp is always evident, both during the day and in low light conditions or darkness.

Customizable Modular Lamp according to the invention consists of a customized outer lens covering a housing which provides at least one recess in which is mounted a custom module which comprises an outer retro-reflective lens, under which there is an inner customized lens, under which there is a printed circuit board with LEDs, which is kept in a bracket fixed to a cover provided with at least one vent; during the day, customization is visible on the outer customized lens; in darkness and—depending on the recipient's request—when activated the lights change direction, position or braking, customization becomes evident by lighting inside the lamp, on the surface of the inner customized lens.

Customizable modular lamp according to the invention has the following advantages:

It is easily customizable through technological processes known per se;

Customization is achieved by means of removable modules, easy to replace;

Is reliable due to constructive simplicity;

Improves through redundancy, the safety of the vehicle's signaling system;

It is an advantageous solution for personalizing limited stocks, from a large volume of products manufactured in an industrial lot.

BRIEF DESCRIPTION OF THE DRAWINGS

Reference is now made more particularly to the drawings, which illustrate the best presently known mode of carrying out the invention and wherein similar reference characters indicate the same parts throughout the views.

FIG. 1 is an isometric view of the elements contained into a customizable modular lamp according to the invention.

DETAILED DESCRIPTION OF THE DRAWINGS

Figure 1A:
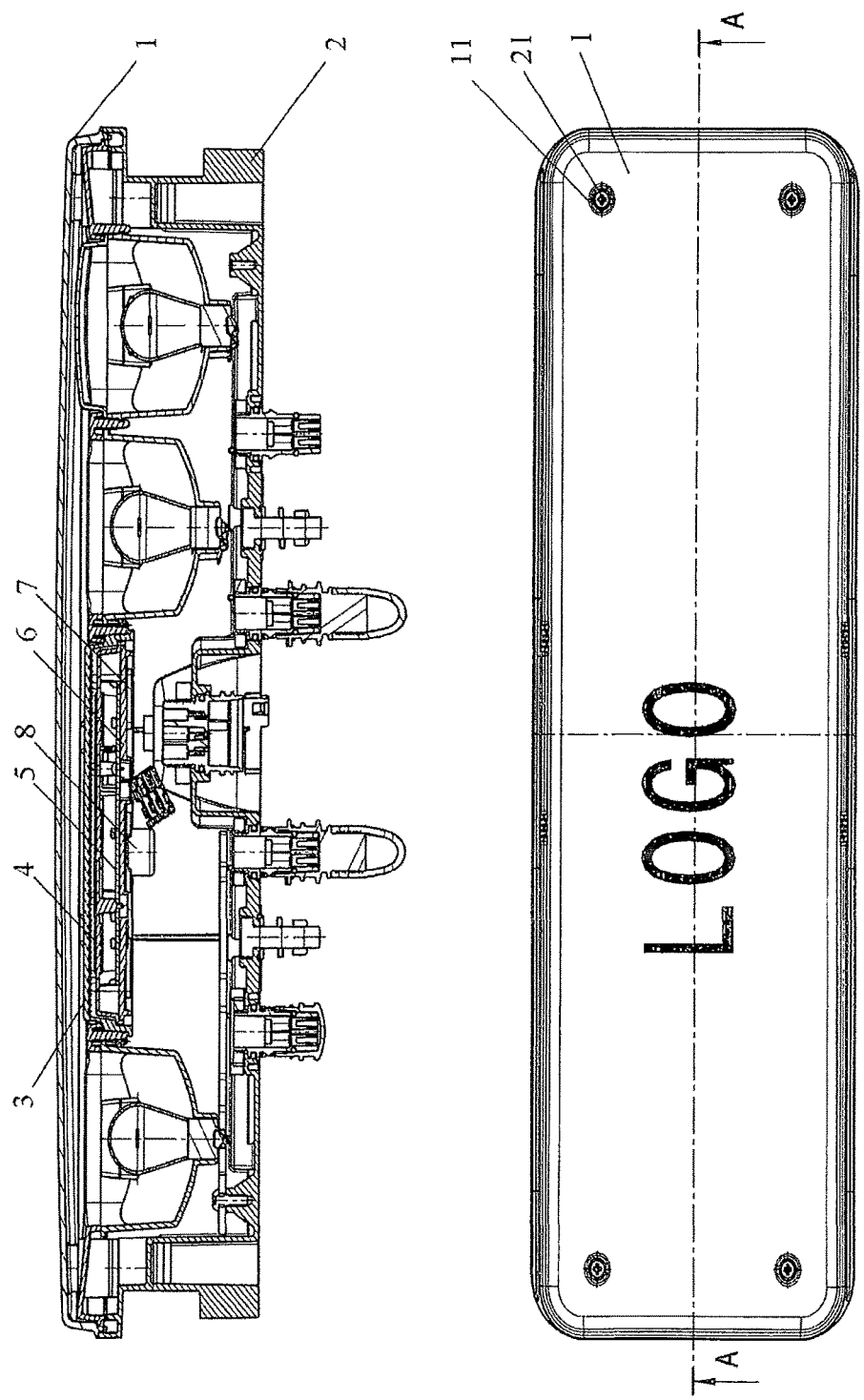
FIG. 1A is a sectional view along line A-A of a customizable modular lamp according to the invention.
Figure 2:
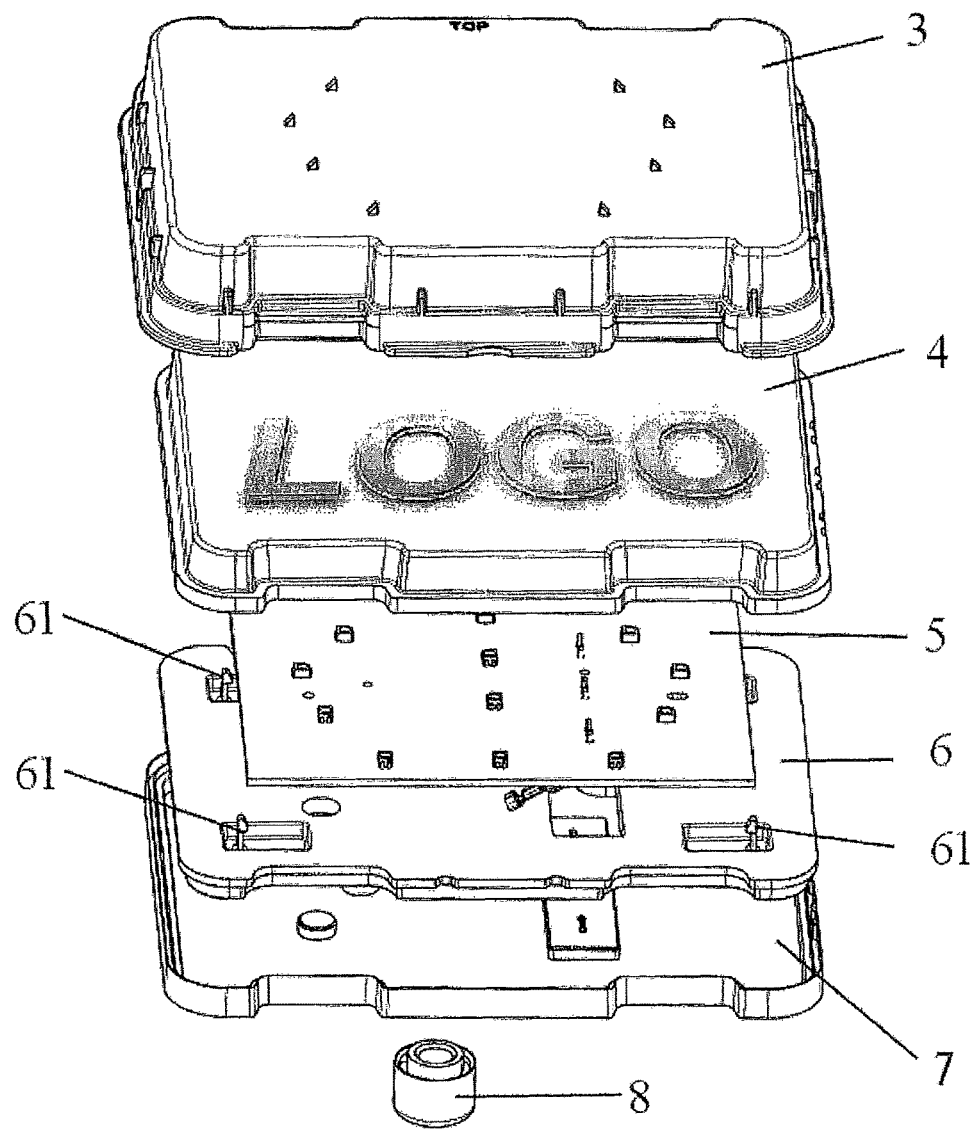
FIG. 2 is an isometric view of the elements contained into a customizable module of a customizable modular lamp according to the invention.
Figure 2A:
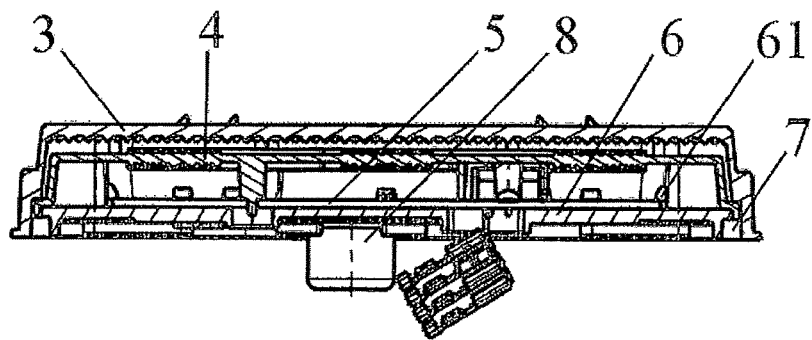
FIG. 2A is a sectional view alone line B-B of a customizable module of a customizable modular lamp according to the invention.
Figure 2A:
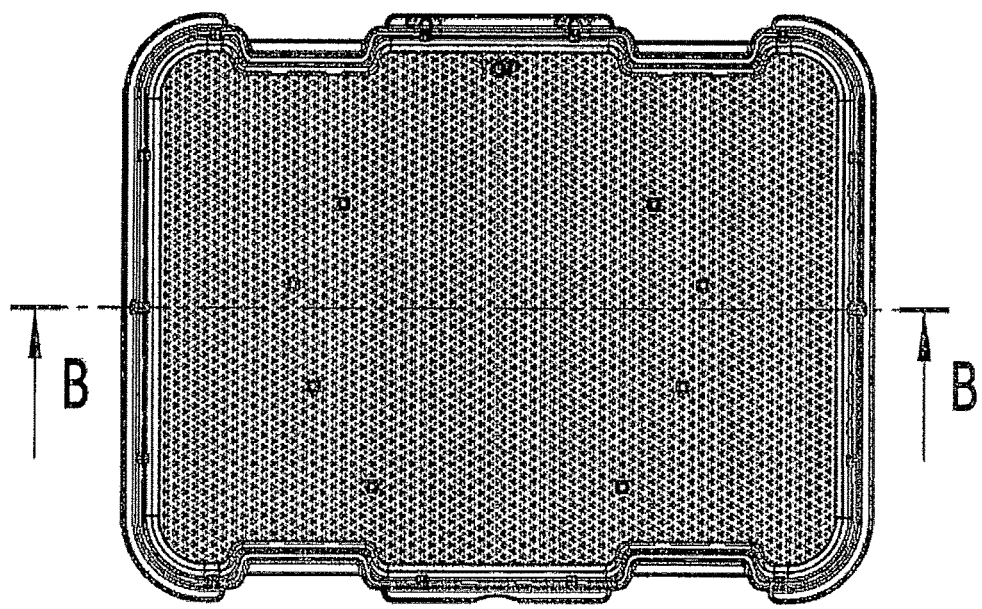

The customizable modular lamp of the present invention comprises (according to the representation in FIG. 1 and FIG. 1a) an outer lens 1 customized by known per se techniques depending on the material from which the lens is made, which covers a housing 2 in which are being fitted, with connectors known per se and their associated wiring known per se, three light signals, namely: direction changing signal, position indicator and braking light; between two signaling lamps, housing 1 provides a recess—rectangular in the example shown—in which is mounted a customizable module consisting (as shown in FIG. 2 and FIG. 2A) of a retro-reflective lens 3, under which there is an inner customized lens 4 personalized by known per se techniques depending on the material from which the lens is made, under which there is a printed circuit board with LEDs 5, which is held by a holder 6 fixed to a cover 7 provided with at least one vent 8; during the day, without position or brake lights being activated, customization is visible on the outer lens 1; in the dark when the lights are activated—position or braking or veering of a vehicle whose electrical system is connected to board 5—customization becomes evident by lighting inside the lamp, on the surface of the inner lens 4.

The outer lens 1 customized according customer request—in the example, with the text "LOGO" (as shown in FIG. 1)—is rectangular shaped, providing a mounting hole 11 in the vicinity of each of its corners, through which a screw 21 known per se secures the outer lens 1 on the casing 2.

The housing 2 has a rectangular shape in the example shown and features four partitions in which are located the three signal lights and the customizable module (as shown in FIG. 1). Each of the corners of housing 2 has a hole fit for a screw 21, and the housing 2 is also provided with fastening elements, known per se, for mounting on a vehicle body, through which some cables, known per se, are passing in order to power and command each of the lamp's lights.

Retro-reflective lens 3 has a rectangular shape with rounded corners, and each of its long sides provides two inner ribs; the retro-reflecting surface of the lens 3 may be provided with triangular or rectangular reflection optical elements.

Inner lens 4 customized as requested by the beneficiary—in the example, with the text "LOGO" (as shown in FIG. 2)—is rectangular with rounded corners, and provides, on each of its long sides, two inner ribs, being constructed so to fit inside the inner ribs of the retro-reflective lens 3.

Printed circuit board with LEDs 5 is rectangular shaped and is kept on the holder 6 with four fixing clamps 61.

The holder 6 has a rectangular shape with rounded corners and each of its long sides is provided with two cutouts, corresponding to the inner ribs of the retroreflective lens 3, being constructed so as to fit inside the cover 7.

The cover 7 is rectangular shaped with rounded corners, and each of its long sides provides two inner ribs, being constructed to join the frame of retro-reflective lens 3.

Venting element 8 has a cylindrical shape and fits to the outside of the cover 7 in a special hole provided in the cover 7.

The hereby described embodiment represents only a particular form for implementing the present invention, which is not limited to such customization, broader applicability of the disclosed technical solutions being obvious to a person skilled in the art.

The invention claimed is:

1. A customizable modular lamp comprising:
    a customized outer lens including a design,
    a customizable module including:
        an inner customized lens including the design;
        a retro-reflective lens to which the inner customized lens is releasably attached, the retro-reflective lens positioned and located between the inner customized lens and customized outer lens;
        a printed circuit board including LEDs positioned under the inner customized lens; and
    a housing including at least one recess in which the customizable module is mounted;
    a holder holding the printed circuit board; and
    a cover to which the holder is fastened, wherein the cover includes at least one element for ventilation.

2. The customizable modular lamp according to claim 1 wherein said retroreflective lens has a rectangular shape.

3. The customizable modular lamp according to claim 1 wherein during daylight, customization is visible on said outer lens and in the dark, the customization becomes evident by lighting inside the lamp on the surface of said inner customized lens, when position lights are activated on a vehicle whose electrical system is connected to said printed circuit board with LEDs.

4. The customizable modular lamp according to claim 1 wherein during darkness, customizing becomes evident inside the lamp on the surface of said inner customized lens when braking lights are activated on a vehicle whose electrical system is connected to said printed circuit board with LEDs.

5. The customizable modular lamp according to claim 1 wherein during darkness, customizing becomes evident inside the lamp on the surface of said inner customized lens when a direction changing signal is activated on the same lamp of a vehicle whose electrical system is connected to said printed circuit board with LEDs.

\* \* \* \* \*